Sept. 20, 1955 P. H. BARNES 2,718,169
DEVICE FOR TEACHING MUSIC
Filed June 26, 1951 3 Sheets-Sheet 1

INVENTOR.
Philip H. Barnes
BY Dybvig & Dybvig
His Attorneys

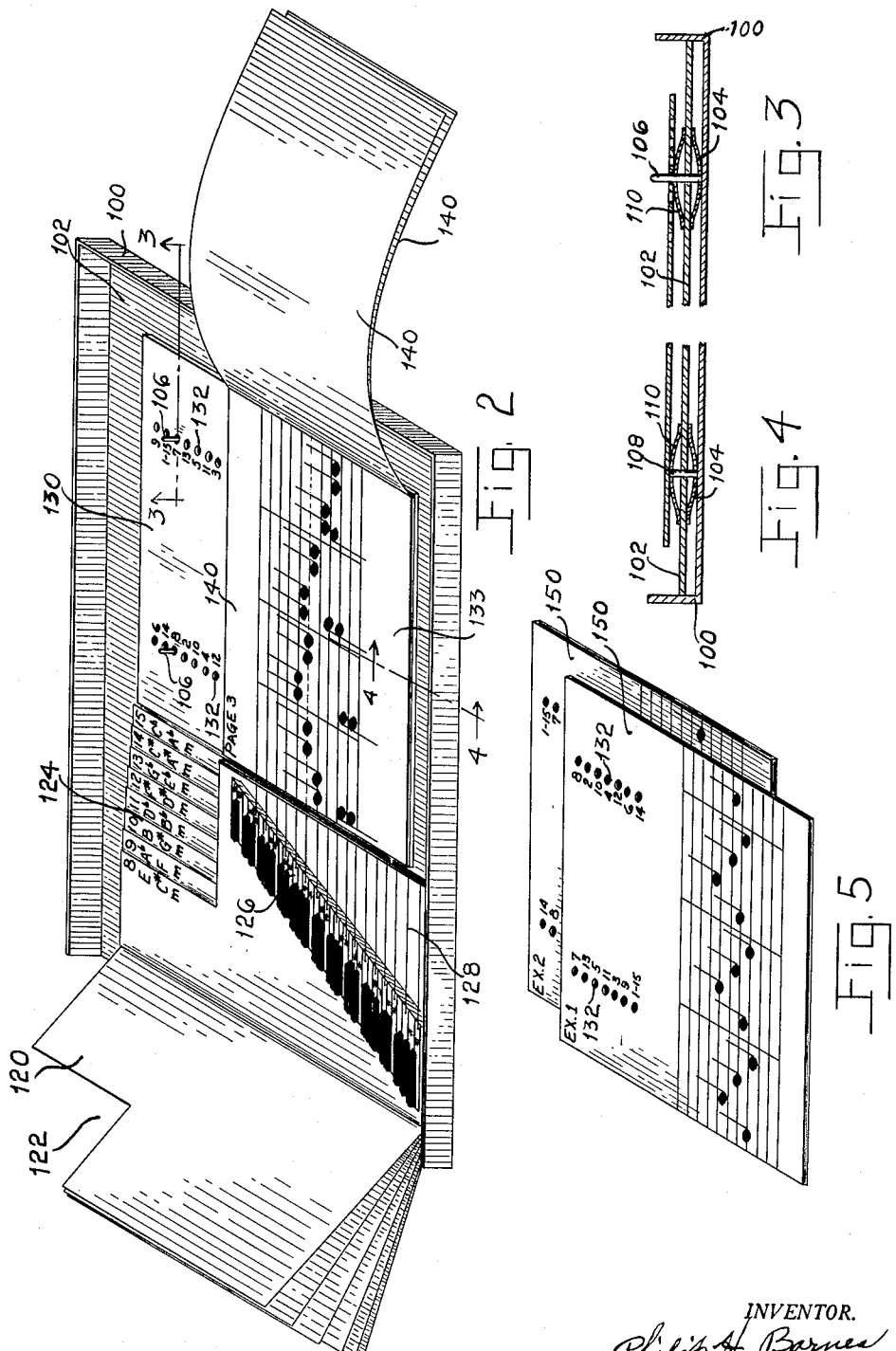

Sept. 20, 1955  P. H. BARNES  2,718,169
DEVICE FOR TEACHING MUSIC
Filed June 26, 1951  3 Sheets-Sheet 3
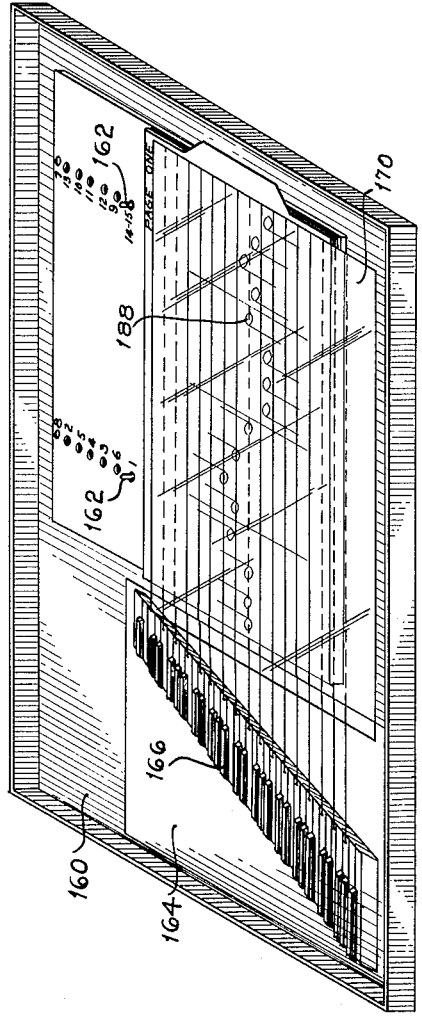
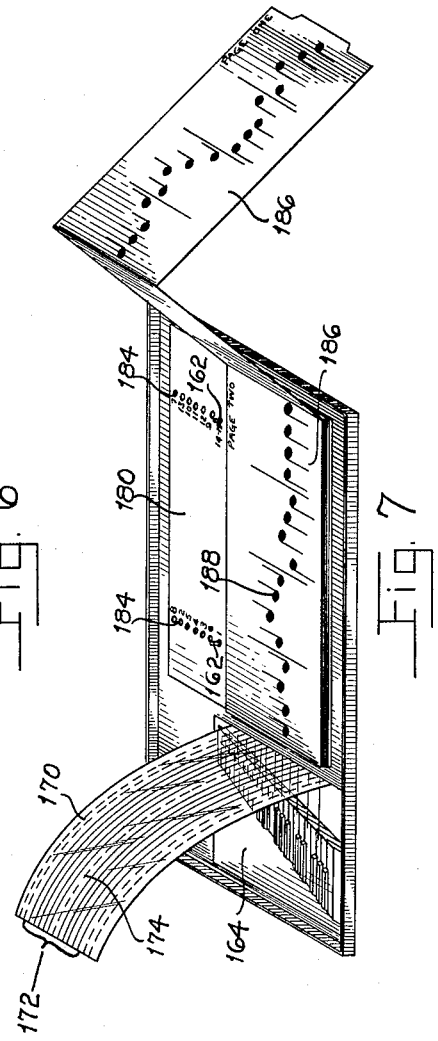
INVENTOR.
Philip H. Barnes
BY Dybvig & Dybvig
His Attorneys

United States Patent Office 2,718,169
Patented Sept. 20, 1955

2,718,169

DEVICE FOR TEACHING MUSIC

Philip H. Barnes, Lexington, Ky.

Application June 26, 1951, Serial No. 233,603

1 Claim. (Cl. 84—480)

This invention relates to a music instruction and transposition device for use with a keyboard instrument, such as a piano, but not necessarily so limited.

An object of this invention is to position a staff or a plurality of staffs having notes thereon aligned with keys of a keyboard instrument in such a manner that the lines of the staff when extended register with the keys corresponding to the notes.

Another object of this invention is to provide a booklet having a series of scales mounted in adjustable position with respect to a depicted keyboard, such that the lines of the staff register with the depicted keys to thereby point out visually the key to be played for a particular note, the adjustment of the booklet transposing the music from one key to another, to thereby aid a pupil in mastering the instrument and the musical composition.

Other objects and advantages reside in the construction of parts, the combination thereof and the mode of operation, as will become more apparent from the following description.

Referring to the drawings,

Figure 1 is a perspective view of a booklet mounted in fixed position with respect to an illustration of a keyboard.

Figure 2 discloses a modification wherein a booklet is adjustably mounted with respect to a plurality of hinged cards, each illustrating a keyboard.

Figure 3 is a fragmentary, cross sectional view, taken substantially on the line 3—3 of Figure 2.

Figure 4 is a fragmentary, cross sectional view, taken substantially on the line 4—4 of Figure 2.

Figure 1:
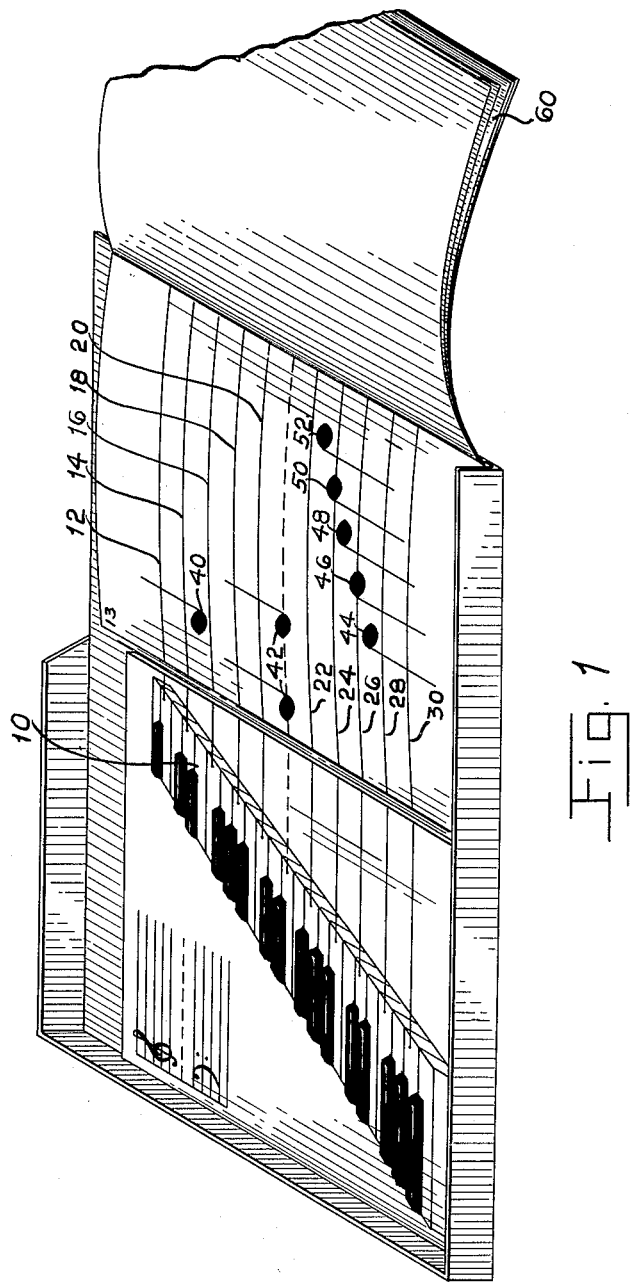

Figure 5 discloses another modification, wherein music is printed on individual cards, the cards being adjustably mounted with respect to a keyboard similar to the keyboard disclosed in Figure 2.

Figure 6 discloses another modification utilizing a transparent sheet containing a great staff.

Figure 7 is another perspective view of the modification disclosed in Figure 6.

Numerous attempts have been made to depict the relative position of notes on a musical staff with respect to the corresponding keys on a keyboard of a musical instrument. This may be the keyboard of a piano, a reed organ, an electric organ, a pipe organ, an accordion, or any other keyboard. In the past, in attempting to illustrate the association of notes with respect to a keyboard, the keyboard is usually mounted above or below the staff. Dotted lines or other methods are used for associating a particular note with a key. Instead of depicting the keyboard above or below the staff and parallel thereto, the keyboard 10, as shown in Figure 1, has been depicted in a diagonal position with respect to the staff of a musical composition, or exercises, as the case may be. By so doing, the notes on the staff are translated into the keys on the diagonally disposed keyboard which has the appearance of a horizontal keyboard and at the same time the staff lines are extended horizontally to point out the corresponding keys.

In Figure 1 the staff lines 12, 14, 16, 18 and 20 designate the treble clef notes. The staff lines 22, 24, 26, 28 and 30 designate the bass clef notes. The notes 40 to 52 are played on the keys either between the staff lines extended, if the notes are located between the staff lines, or on the keys aligned with the staff lines if the notes are printed on the staff lines. For example, the note 40, designating C above middle C, is located between the staff lines 14 and 16, the staff line 14 when extended terminating on the key D and the staff line 16 on the key B. The note 50 is located on the staff line 24 of the bass clef staff and terminates when extended on the key F. By this means it is very easy for the pupil to strike the right key for a particular note and thereby learn to associate the notes on the staff with the keys on the keyboard, without learning the names of the notes and the names of the keys. By arranging the notes of a composition on a series of pages identified collectively by the reference character 60, it is possible to arrange an entire composition in proper aligned relation with the depicted keyboard.

In the modification disclosed in Figure 1, only one tonality has been illustrated. No method has been shown in this modification for transposing from one tonality to another.

In the modification disclosed in Figures 2 to 5, a system has been disclosed wherein the musical composition written in a particular tonality may be transposed so as to be played in any other tonality.

In the modification disclosed in Figures 2 and 3, the base 100, simulating on open-ended box, supports a floating base member 102 held in spaced relation from the bottom of the box 100 by a plurality of dished washers 104. Two of these washers have fixedly attached thereto pins 106 and one or more of the washers have fixedly attached thereto a stub pin 108. Each of the pins 106 and 108 has mounted thereon a dished washer 110 in opposition to the washers 104.

Base member 102 has fixedly attached thereto a plurality of hinged cards 120, each having a cut-out corner 122, the cut-out portions 122 varying in size, so as to provide an exposed area 124 on each card, having printed thereon the number of the card and the tonalities. Each card has also depicted thereon a diagonally disposed keyboard 126. Every alternate white key on the keyboard is provided with a straight line 128 adapted to register with a staff line, which will appear more fully later.

A card 130, provided with a plurality of apertures 132 arranged in two rows, is mounted on the base member 102 with the pins 106 projecting upwardly through a selected pair of apertures 132. Adjacent each aperture is found one or more code numbers. In Figure 2 the pins 106 have been projected through the third hole in each column of holes. The pin to the left projects through the aperture identified by code No. 8 and the pin to the right projects through the aperture identified by code No. 7. The white or ivory keys that have indicated thereon a sharp or a flat are to be played as sharp or flat tonalities, as the case may be. The keys C, D, F and G, as shown in Figure 2, are played in the sharp tonality. The white keys C, D, F and G in Figure 2 have been marked with a sharp. In transposing to another tonality, appropriate sharps or flats are indicated on the white keys.

The composition appearing in the form of a booklet 133 is fixedly attached along one margin to the card 130. The composition may then be played either in the tonality of E major or the tonality of C♯ minor by turning to card No. 8 of the cards 120. By turning to card No. 7, which has not been shown, the same composition may be played in E♭ major or the tonality of C minor. If, for example, it is desired to play the composition in F♯, the pins 106 should then be projected through the bottom apertures identified by the code Nos. 12 and 3 and the card No. 12 exposed. By this arrangement, it is possible to transpose a piece of written music to any tonality that the player may desire.

For example, if the Andante from the "Surprise" Symphony by J. Haydn is written on the sheets 140 forming a booklet fixed to the card 130, it is possible for the player to play this number in any desired tonality by merely deciding upon which tonality the player prefers. For the purpose of illustration, let it be assumed that the player prefers the tonality of F♯. By referring to the exposed areas on the cards 120, F♯ is found on card bearing code No. 12. On card 130 the code No. 12 is found to register with the lowest aperture in the column of apertures to the left in Figure 2. He then places the composition with the pins 106 projecting through the two lowest apertures in the two columns of apertures. In order to cause the staff lines to be properly positioned with respect to the lines 128, the pins 106 should be projected through a pair of apertures 132 lying in the same horizontal plane, as viewed in Figure 2.

Instead of using a booklet or a series of pages secured to an apertured card 130, exercises or scales may be printed upon individual cards 150, two of which have been shown in Figure 5. By this arrangement, the pupil may practice the same exercise in a plurality of tonalities. For example, if exercise 1, shown on the card 150, is placed in such a manner that the pins 106 project through the second apertures from the top of each column of apertures 132, the exercise may be practiced in either the tonality of G♭ major or E♭ minor. By projecting the pins through another pair of horizontally disposed apertures in the card 150, the same exercise may be practiced in other tonalities. On the exposed areas 124 of the cards 120, the first tonality directly below the identification numeral denotes the major tonality. The other letter denotes the minor tonality. If a composition is originally written in a minor tonality, it may be transposed to another minor tonality by moving the card 130 up or down.

In the modification disclosed in Figures 6 and 7, a base 160 is provided with a pair of pins 162 and has fixedly attached thereto a cardboard 164 having depicted thereon in perspective a diagonally disposed keyboard 166. A transparent plastic sheet 170 is attached to the cardboard 164 along one margin thereof. This plastic sheet has printed thereon a great staff 172. As is well known to those skilled in the art, the broken center line 174 is directed to middle C when extended. A great staff consists of eleven lines, the sixth line representing the position of middle C. By this arrangement, it can readily be seen that there are five staff lines above the middle C line and five staff lines below the middle C line. Ledger lines, that is, the dash lines, appear above and below the great staff lines. Ledger lines are only added when needed.

A cardboard 180 provided with a plurality of pairs of apertures 184 may have a fan-fold strip 186 attached thereto, which strip 186 contains notes 188. A code is printed on the card 180. This code may be deciphered by referring to suitable printed matter containing information similar to the number and tonalities printed upon the areas 124 adjacent the cut-out portions 122 of the hinged cards 120 shown in Figure 2. The transparent plastic sheet 170 is laid over the exposed notes 188 on the strip 186, the notes being read through the transparent sheet 170. Furthermore, the notes are so printed on the strip 186 that the notes assume the proper position with respect to the great staff printed on the transparent plastic sheet 170, as clearly shown in Figure 6. In playing this music, it is merely necessary to remove page by page of the fan-fold strip 186, so as to expose the notes on succeeding pages. Furthermore, in this modification it is merely necessary to shift the cardboard 180 with respect to the pins 162 to transpose the music from one key to another.

Although members 164 and 180 have been referred to as cardboards, these may be made of any other sheet material, either of paper stock or any other suitable material.

Likewise, the great staff lines need not necessarily be printed. They may consist of material embedded in the transparent sheet or may consist of engravings, or the staff lines may be reproduced in any other suitable manner.

Also, in this modification, the fan-fold strip 186 could be replaced by a booklet disclosing pages, as disclosed in connection with the preferred embodiment, but using the transparent sheet and the fixed depicted keyboard.

Instead of using pins and apertures for positioning the music with respect to the keyboard, any other device for properly positioning the music with respect to the depicted keyboard may be used.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

In a device for teaching music and for transposition and placing of music in any selected tonality, a shallow box-like base member provided with pins, a card disposed along the longitudinal side of said base member and stopping short of its end, provided with apertures adapted to be selectively engaged by said pins, a sheet of notes written without staff attached along its upper edge to the longitudinal edge of said card and adapted for movement with it, a transparent sheet carrying staff lines adapted to be disposed over said sheet of notes and to provide for said sheet of notes a staff, a card bearing the simulation of a keyboard presented diagonally and in perspective, said keys on said keyboard corresponding to the lines of said staff, printed matter containing information as to the tonalities of the music interpreted for indicia on said first mentioned card, said indicia so placed at the positions of the apertures that music on said sheet of notes may be selectively placed by means of said pins and apertures at positions selected by coordination of said indicia and said printed matter for transposition and rendition in any selected tonality.

References Cited in the file of this patent

UNITED STATES PATENTS

| Number | Name | Date |
| --- | --- | --- |
| 539,191 | Pond | May 14, 1895 |
| 632,137 | Morriss | Aug. 29, 1899 |
| 658,902 | Turner | Oct. 2, 1900 |
| 659,113 | Turner | Oct. 2, 1900 |
| 946,291 | Turner | Jan. 11, 1910 |
| 1,354,214 | Robinson | Sept. 28, 1920 |
| 1,400,947 | Fennell | Dec. 20, 1921 |
| 1,713,282 | Inskeep | May 14, 1929 |
| 1,724,904 | Buxton | Aug. 20, 1929 |
| 1,741,769 | Hall | Dec. 31, 1929 |
| 1,768,706 | Miller | July 1, 1930 |
| 1,780,918 | Holzman | Nov. 11, 1930 |
| 1,844,976 | Rantz | Feb. 16, 1932 |
| 2,271,772 | Maffei | Feb. 3, 1942 |

FOREIGN PATENTS

| Number | Country | Date |
| --- | --- | --- |
| 49,896 | Sweden | Aug. 17, 1921 |